United States Patent
Schilling et al.

(10) Patent No.: US 11,925,961 B1
(45) Date of Patent: Mar. 12, 2024

(54) WIRE BRACKET ASSEMBLY FOR CONTAINMENT BERM

(71) Applicant: PacTec, Inc., Clinton, LA (US)

(72) Inventors: Michael R. Schilling, Clinton, LA (US); Troy Town, Clinton, LA (US)

(73) Assignee: PacTec, Inc., Clinton, LA (US)

( * ) Notice: Subject to any disclaimer, the term of this patent is extended or adjusted under 35 U.S.C. 154(b) by 0 days.

(21) Appl. No.: 16/927,199

(22) Filed: Jul. 13, 2020

Related U.S. Application Data (60) Provisional application No. 62/875,281, filed on Jul. 17, 2019.

(51) Int. Cl.
*B08B 15/02* (2006.01)
*F16N 31/00* (2006.01)

(52) U.S. Cl.
CPC ............ *B08B 15/02* (2013.01); *F16N 31/006* (2013.01)

(58) Field of Classification Search
CPC ..... B08B 15/02; B08B 17/025; F16N 31/006; B65D 90/047; B65D 90/048; B65D 90/046
USPC ....... 220/9.2, 9.3; 248/107, 112, 175, 218.3, 248/302
See application file for complete search history.

(56) References Cited

U.S. PATENT DOCUMENTS

| | | | | | |
|---|---|---|---|---|---|
| 945,520 | A | * | 1/1910 | Green | F41A 23/18 |
| | | | | | 248/175 |
| 1,575,963 | A | * | 3/1926 | Bispham | A47G 1/24 |
| | | | | | 248/302 |
| 3,429,541 | A | * | 2/1969 | Herman | A61H 3/02 |
| | | | | | 248/302 |
| 3,532,225 | A | * | 10/1970 | Reed | A47F 5/13 |
| | | | | | 211/69.9 |
| 3,680,819 | A | * | 8/1972 | Meland | G09F 3/12 |
| | | | | | 248/302 |
| 4,175,602 | A | * | 11/1979 | Cavalaris | A45C 3/00 |
| | | | | | 141/390 |

(Continued)

OTHER PUBLICATIONS

Screen captures from YouTube video clip entitled "Ultra-Containment Berm Comparison Video", 4 pages, uploaded on Oct. 28, 2015 by UltraTech International, Inc. Retrieved from Internet: https://www.youtube.com/watch?v=wMOROsU3nSs (Year: 2015).*

(Continued)

*Primary Examiner* — Don M Anderson
*Assistant Examiner* — Eric C Baldrighi
(74) *Attorney, Agent, or Firm* — Jones Walker LLP (57) ABSTRACT

A containment berm having a flexible, substantially impermeable polymer material forming a ground section with a plurality of sidewalls extending upward from the ground section. A plurality of bracket assemblies are positioned on an external surface of the containment berm. Each of the bracket assemblies includes (i) a pair of first leg segments having first and second ends, the pair of first leg segments being joined by an end segment at their second ends; (ii) a pair of second leg segments having first and second ends, the pair of second leg segments being configured to allow relative movement between their second ends; and (iii) the pair of first leg segments and the pair of second leg segments being joined at their first ends in a substantially perpendicular configuration. One of either the pair of first or second of leg segments engages pockets on the sidewalls.

20 Claims, 6 Drawing Sheets

(56) References Cited

U.S. PATENT DOCUMENTS

| | | | | |
|---|---|---|---|---|
| 4,570,275 | A | * | 2/1986 | Merriman ............ A61G 7/0501 248/175 |
| 5,427,340 | A | * | 6/1995 | Stromsmoe ......... B65B 67/1205 248/97 |
| 5,471,689 | A | * | 12/1995 | Shaw ..................... A47C 21/08 5/426 |
| 6,121,527 | A | * | 9/2000 | Hamm .................... G10G 5/00 84/421 |
| 6,279,762 | B1 | * | 8/2001 | Buchalter ........... B42F 15/0094 211/189 |
| 8,562,251 | B2 | | 10/2013 | Beak et al. |
| 9,181,026 | B2 | | 11/2015 | Laing et al. |
| 9,869,427 | B2 | | 1/2018 | McAtarian et al. |
| 2007/0127852 | A1 | | 6/2007 | Town et al. |
| 2011/0174713 | A1 | | 7/2011 | Ramp et al. |
| 2012/0193369 | A1 | | 8/2012 | Beak et al. |
| 2013/0240538 | A1 | * | 9/2013 | Beak .................... B08B 17/025 220/646 |
| 2014/0246441 | A1 | | 9/2014 | Starr et al. |
| 2017/0144835 | A1 | | 5/2017 | Butler et al. |

OTHER PUBLICATIONS

Screen captures from YouTube video clip entitled "DIY smartphone stands", 2 pages, uploaded on Nov. 4, 2014 by CNET. Retrieved from Internet: https://www.youtube.com/watch?v=91auY89dyIM (Year: 2014).*

Screen captures from YouTube video clip entitled "iPhone Paper Clip Stand", 1 page, uploaded on Sep. 26, 2008 by deanying. Retrieved from Internet: https://www.youtube.com/watch?v=nmgTKDrheYs (Year: 2008).*

Screen captures from YouTube video clip entitled "Swimming Pool: Best Above Ground Pool (Buying Guide)", 1 page, uploaded on Jan. 3, 2018 by Review Tube. Retrieved from Internet: https://www.youtube.com/watch?v=Yew-OJhfkn4 (Year: 2018).*

U.S. Appl. No. 15/680,398 (Self-Supporting Waste Disposal Enclosure)—Examiner's Action dated Feb. 7, 2019.

U.S. Appl. No. 16/102,295 (Hinge Pocket Assembly for Containment Berm).

U.S. Appl. No. 16/102,295 (Hinge Pocket Assembly for Containment Berm)—Examiner's Final Rejection dated Mar. 3, 2021.

* cited by examiner

WIRE BRACKET ASSEMBLY FOR CONTAINMENT BERM

I. CROSS REFERENCE TO RELATED APPLICATION

This application claims the priority benefit under USC § 119 to U.S. Provisional Application No. 62/875,281, filed on Jul. 17, 2019, which is incorporated by reference herein in its entirety.

II. BACKGROUND

Figure 1:
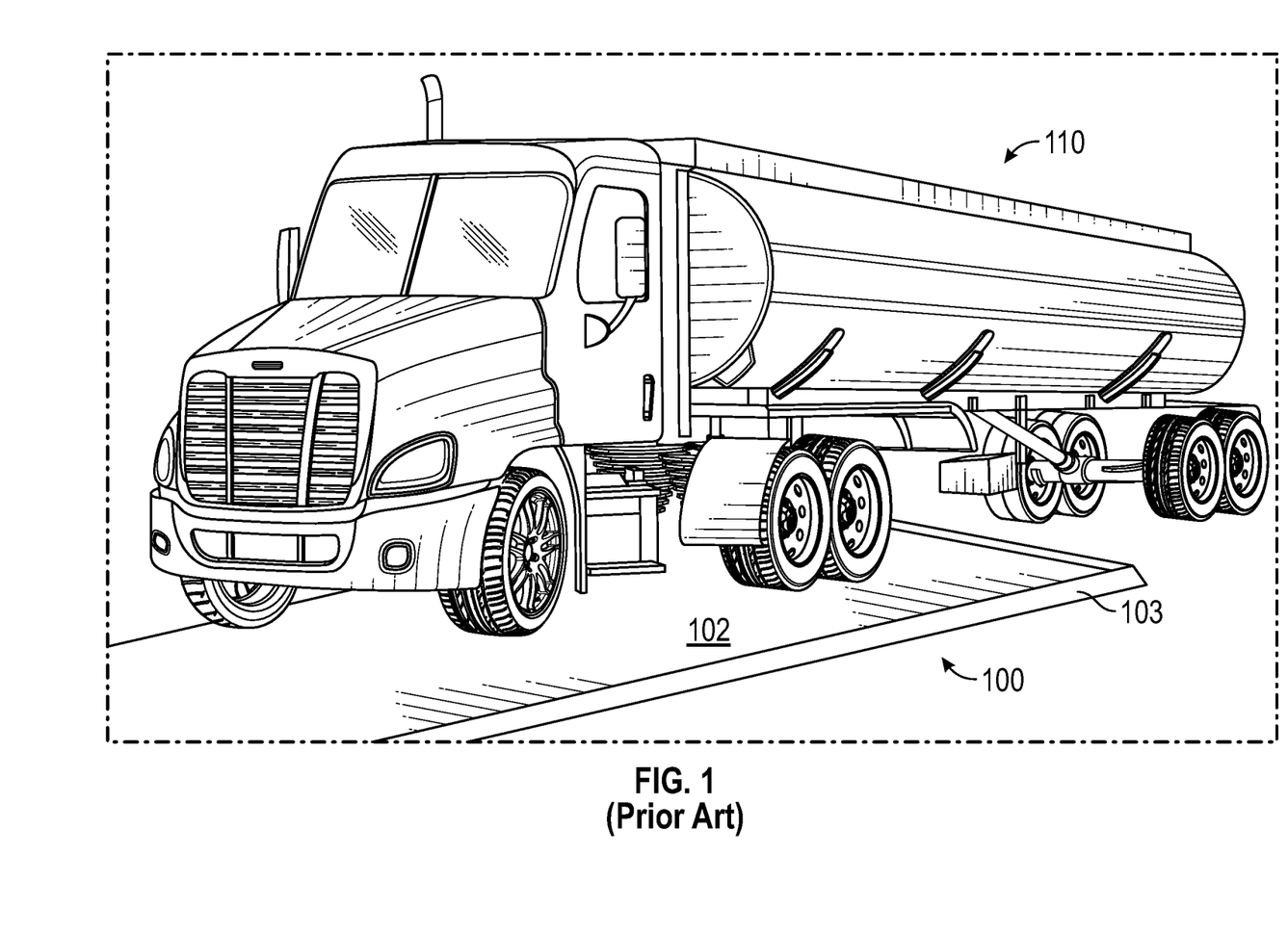
FIG. 1 illustrates a prior art containment berm.

This disclosure is directed to a flexible, portable containment apparatus for capturing liquid pollutants such as petrochemicals and the like. Environmental ground contamination is often the long term result of repeated spills of such materials during the transfer from one container to the other at a particular site, for example where vehicles are fueled and serviced. Flexible, portable structures for capturing pollutants or contaminants, often called "containment berms" are well known in the art. FIG. 1 illustrates a containment berm 100 having a ground section 102 and sidewalls 103. Although section 102 is referred to as a "ground section," the containment berm could be positioned on any surface where potential spills need to be contained, e.g., within a building workspace or on an elevated platform.

Whether the berm is rectangular, round, or otherwise, sidewalls normally enclose berm 100 to prevent the escape of liquids. In FIG. 1, the sidewalls 103 are shown in a substantially lowered or collapsed state. The vehicle 110 will drive over the sidewalls 103 and once the vehicle is fully over ground section 102, the sidewalls 103 may be raised. Although not specifically shown in FIG. 1, it is also well known to position brace members against the sidewalls to maintain sidewalls 3 in a raised position to retain spilled liquids within the containment berm.

Often these braces are rigid, bulky devices which are not easily installed on the containment berm. When the braces are not permanently attached to the berm material, the braces easily become misplaced and are not available when needed. When the braces are attached to the berm material, the braces are often a hindrance to compactly folding the containment berm for storage. Additionally, when the permanently attached braces become damaged, it is often necessary to replace the entire containment berm as opposed to merely the damaged brace(s). A containment berm having inexpensive braces which can be easily replaced would be a significant improvement in the art.

III. SUMMARY OF SELECTED EMBODIMENTS

One embodiment of the invention is a containment berm having a flexible, substantially impermeable polymer material forming a ground section with a plurality of sidewalls extending upward from the ground section. A plurality of bracket assemblies are positioned on an external surface of the containment berm. Each of the bracket assemblies includes (i) a pair of first leg segments having first and second ends, the pair of first leg segments being joined by an end segment at their second ends; (ii) a pair of second leg segments having first and second ends, the pair of second leg segments being configured to allow relative movement between their second ends; and (iii) the pair of first leg segments and the pair of second leg segments being joined at their first ends in a substantially perpendicular configuration. One of either the pair of first or second leg segments engages a pocket on the ground section and the other of the pair of first or second leg segments engages a pocket on a sidewall.

V. DETAILED DESCRIPTION OF SELECTED EMBODIMENTS

Figure 2:
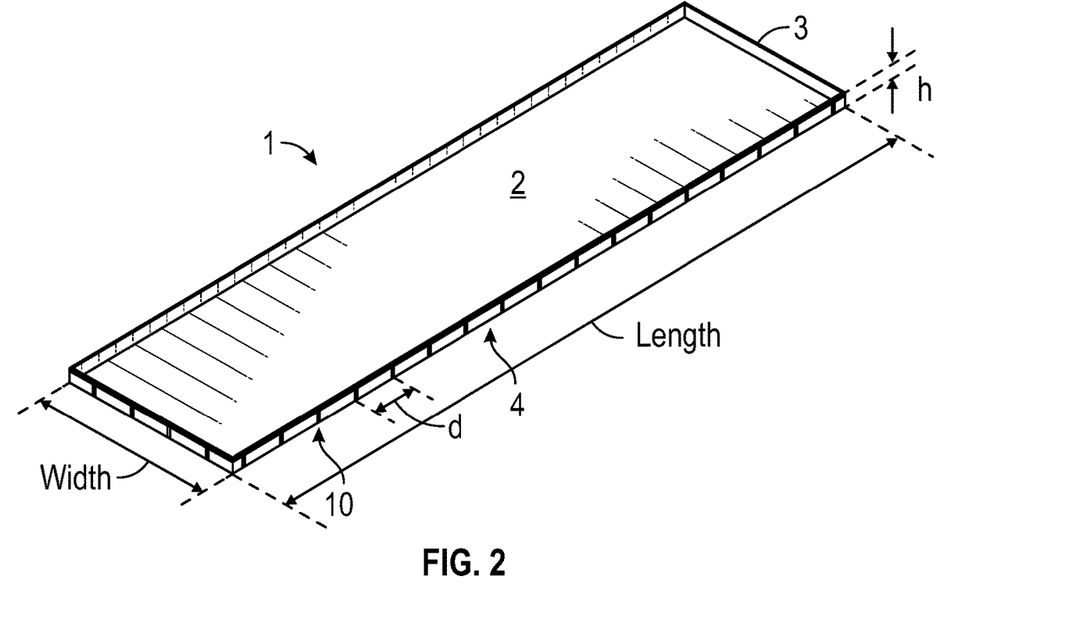
FIG. 2 is a perspective view of a containment berm with one embodiment of the bracket assembly of the present invention.

FIG. 2 shows a section of a containment berm 1 generally formed of the ground section 2, the sidewalls 3, and the bracket-pocket assemblies (or sometimes "bracket assemblies") 10 positioned between the ground section 2 and a sidewall 3 on the external surface of the containment berm 1. In FIG. 2, bracket assembly 10's connection to the ground section is on the underside 4 of the ground section which is hidden from view in FIG. 2. Typical heights "h" for berm sidewalls 3 often range between 4" and 24" (although lengths outside this range are possible). As suggested in FIG. 2, containment berms are often rectangular, but could be circular or any other shape. The size of the containment berms can vary greatly, for example as small as a width× length of 3'×3' to greater than 50'×100' (including any size area in between and any geometric configuration). In other embodiments, the containment berm will have a length of between 3' and 200', a width between 3' and 100', and a wall height between 4" and 3'.

Figure 3A:
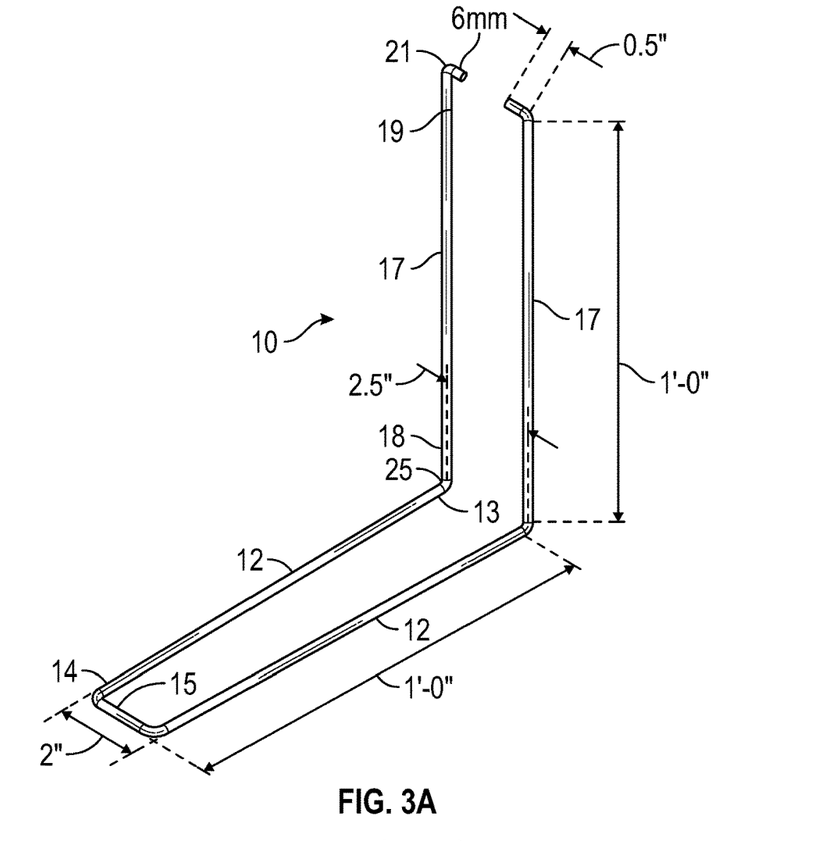
FIGS. 3A to 3C illustrate three embodiments of the bracket assemblies.

FIG. 3A shows one embodiment of a bracket assembly 10. The bracket assembly 10 includes a pair of first leg segments 12 with each leg segment 12 having first end 13 and second end 14 and the two first leg segments 12 being joined by an end segment 15 at the second ends 14 of the first leg segments 12. A pair of second leg segments 17 also have first ends 18 and second ends 19, with the second leg segments 17 being connected to the first leg segments 12 at the joinder section 25 in a substantially perpendicular configuration. In certain embodiments, "substantially" perpendicular means between 65° and 115° (i.e., with "perpendicular" being 90°), while in other embodiments, it means between 75° and 105°, or between 85° and 95°. It can be seen that the second ends 19 of the second leg segments 17 are not joined together and thus are configured to allow relative movement between the second ends 19. In the embodiments shown in FIGS. 3A and 3B, the second ends 19 of the second leg segments 17 have leg tips 21 bent inward toward one another. FIG. 3C shows an embodiment where leg tips 21 are turned in an opposing direction. In other words, in the plane containing both second leg segments 17, the tips 21 are oriented about 180° away from one another, i.e., in a generally opposing direction in the plane containing the pair of second leg segments.

Figure 3B:
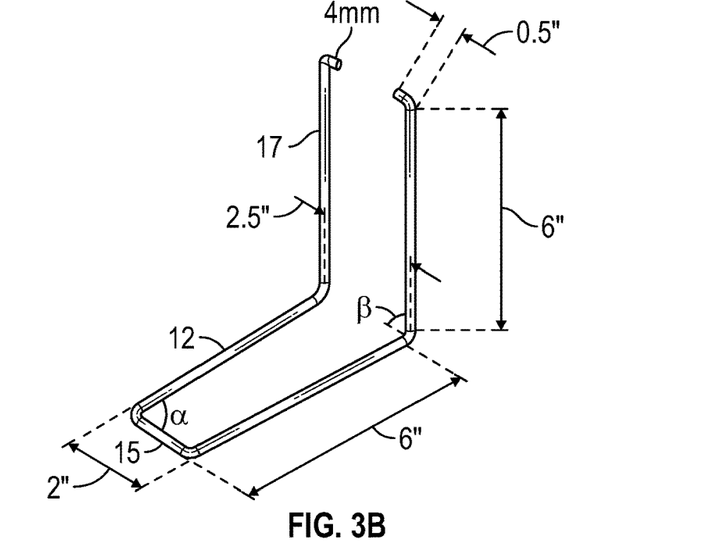
Figure 3C:
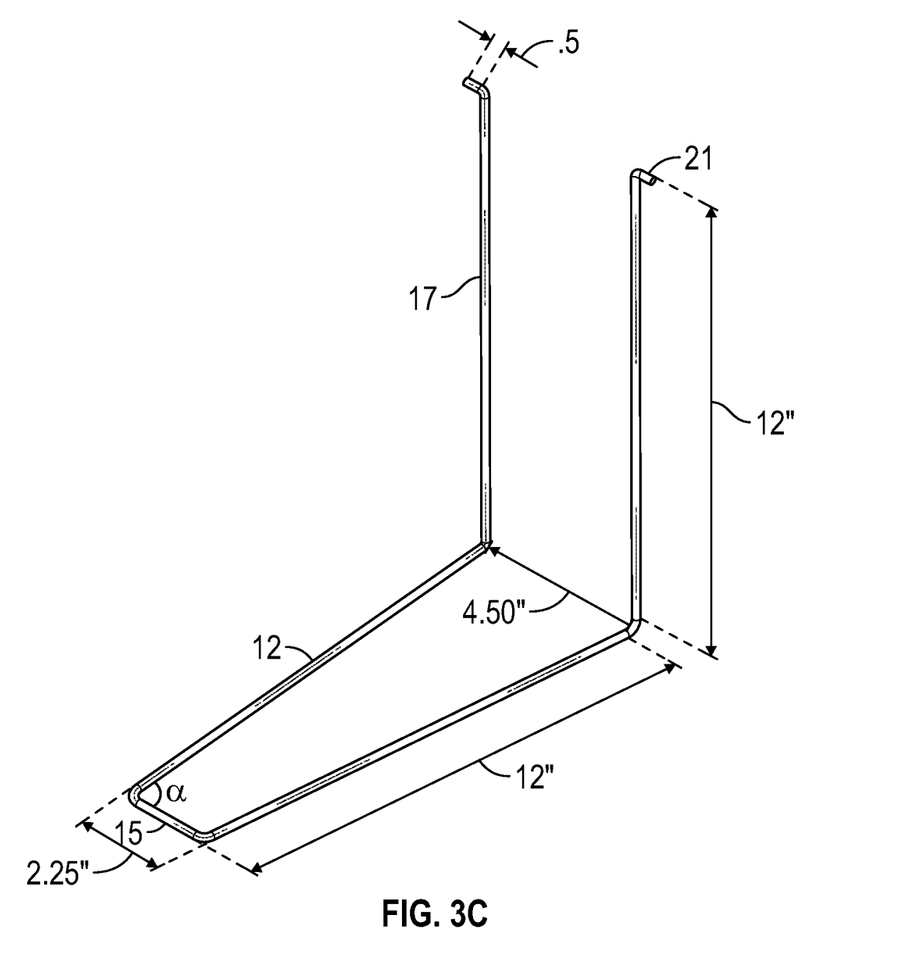

In many embodiments, the first and second leg segments 12 and 17 are each between 4" and 24" in length (e.g., 12" in FIG. 3A and 6" in FIG. 3B). In such cases, the segment 15 is typically between 1" and 5" in length. While the first and second leg segments are often the same length, there may be embodiments where they are of different lengths.

The leg tips normally have a length of between 0.20" and 2.0", with the FIGS. 3A to 3C embodiments having a length of Stated differently, tips 21 will in many embodiments have a length that is between 1.5% and 15% (or any sub-range in between) the length of second segments 17.

The bracket assembly 10 can be made of many different materials, including metals and polymers, as long as the material exhibits sufficient spring force to function as described below. A conventional spring steel rod between 2 mm and 12 mm (or any subrange in between) in diameter is one preferred material. For example, the rod could be SAE grade 1074/1075, 1095, 5160, 9255, or 301. In preferred embodiments, the rod is galvanized steel. Of course, the "rods" could employ a non-round cross-section with a cross-sectional area of, for example, between 5 mm$^2$ and 125 mm$^2$. In many embodiments, the bracket assembly 10 is a continuously fabricated section of wire (i.e., fabricated by drawing or rolling) bent beyond its yield point into the shape described above. However, the bracket assembly could alternatively be formed of discrete sections of material welded or otherwise connected together in the final shape of the bracket. In either case, the bracket assembly is constructed such that in its relaxed state, the spring force of the material causes the two joinder sections 25 to spread apart a greater distance than the length of end segment 15. In preferred embodiments when the bracket assembly is in the relaxed state, the distance between the two joinder sections 25 will be between 5% and 50% greater (or any subrange in between) than the length of end segment 15. FIG. 3B suggests how an angle alpha ($\alpha$) is formed between leg segment 12 and end segment 15. In many embodiments, this angle $\alpha$, when the bracket assembly is in the relaxed state, will be somewhat greater than 90°, e.g., any angle between 95° and 135°. FIG. 3C shows an $\alpha$ of 95°.

Figure 4:
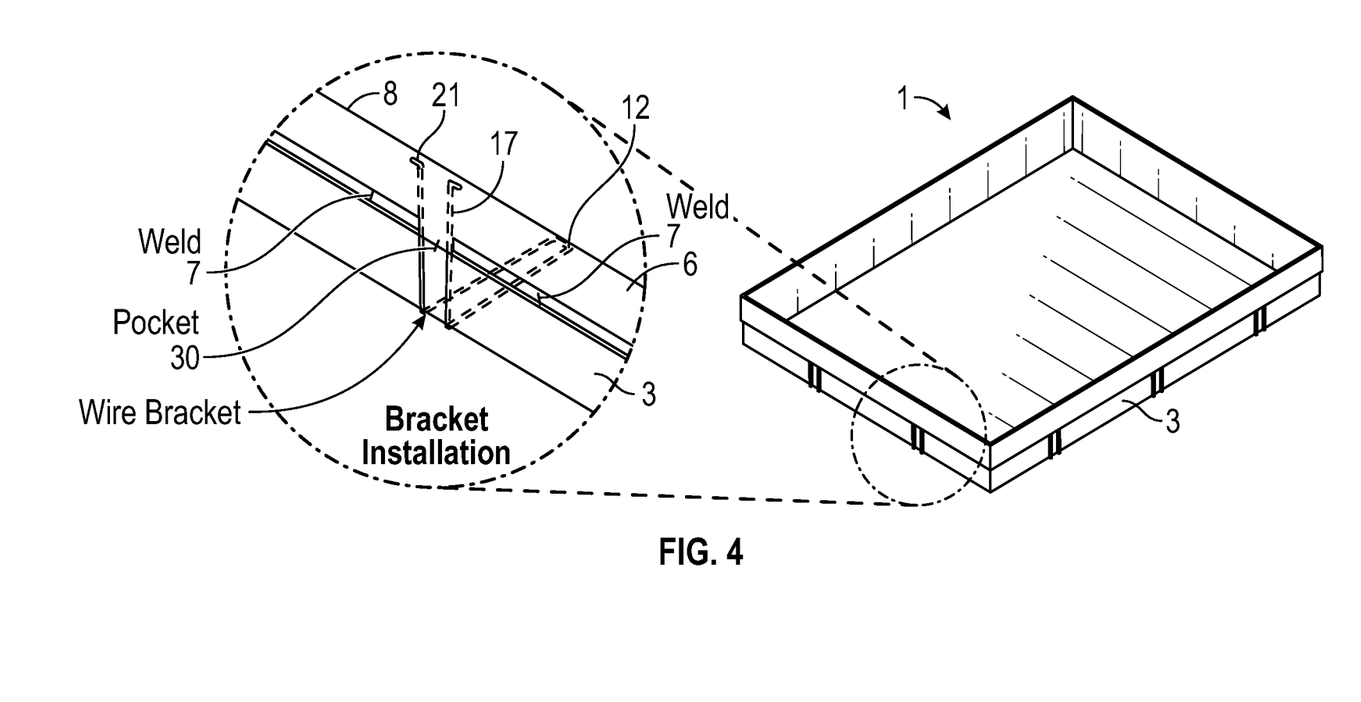
FIG. 4 illustrates the bracket assembly engaging one embodiment of a pocket formed on the berm sidewall.

In most embodiments, the bracket assembly 10 will support the sidewalls 3 of containment berm 1 by one pair of the leg segments (either first 12 or second 17) engaging a pocket on the sidewall 3. The detail section of FIG. 4 illustrates one example of how a sidewall pocket may be formed on the berm. A 2" to 6" upper flap 6 of sidewall 3 is folded outward and downward back against the outer portion of sidewall 3 adjacent to flap 6. Heat weld sections 7 secure the lower edge of flap 6 to the adjacent portion of sidewall 3 below the upper edge 8 of the sidewall. However, breaks or spaced apart gaps are left in weld sections 7 that will form pockets 30. As suggested in FIG. 4, the width of pockets 30 (i.e., gaps in section 7) will be sufficient that the second pair of leg segments 17 can be squeezed together and inserted in pockets 30, but the pocket width is somewhat narrower than the distance between leg segments 17 in the bracket's relaxed state. In many embodiments, this width is between about 3" and about 6". When leg segments 17 are allowed to return to their relaxed state, they will expand against the edges of the pockets 30, i.e., the edges of weld sections 7. The leg segments 12 will rest between the ground and the outer surface of the bottom section 4 of the berm.

It can be envisioned from FIG. 4 how forces (e.g., wind) lifting the berm 1 would normally have a tendency to pull the bracket assemblies 10 out of engagement with pockets 30. However, it will also be seen that the tips 21 on leg segments 17 will engage the edges of pockets 30 and prevent complete withdrawal of the leg segments 17 from the pockets. Likewise, when it is desired to remove leg segments 17 from pockets 30, the leg segments can be squeezed together to allow tips 21 to slide past the pocket edges.

Figure 5:
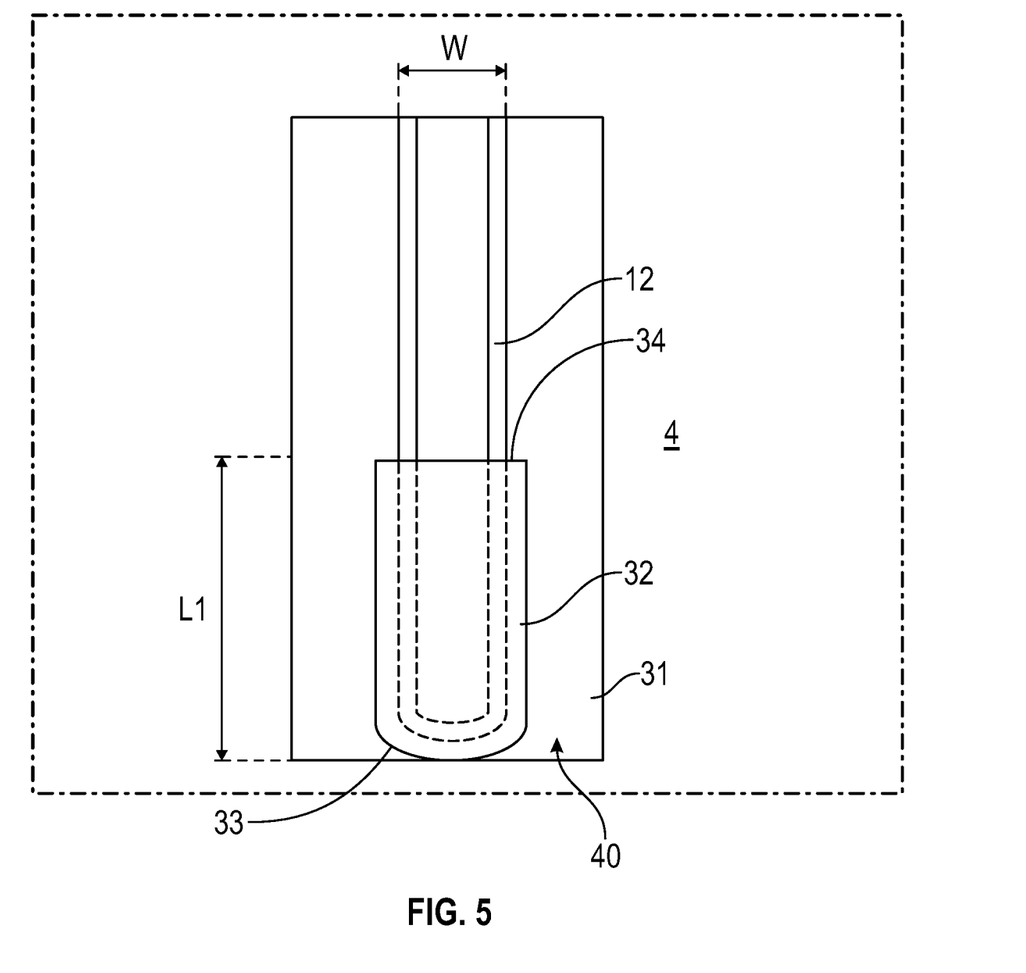
FIG. 5 illustrates another embodiment of the material layers forming a bracket pocket.

Although the FIG. 4 embodiment shows the leg segments 12 not retained in a pocket, alternative embodiments could also secure leg segments 12 in a pocket positioned on the underside 4 of berm ground section 2. FIG. 5 illustrates a pocket 40 formed of two layers or panels of material bonded, sewn, or otherwise fixed to the ground section. The panels may be formed of many different materials having the required strength, but often will be constructed of the same material as the berm itself, e.g., polyvinyl chloride, polyethylene, urethane or a blend of various polymers to provide specific chemical resistance or structural characteristics. The panels' thicknesses may vary based on the mechanical characteristics desired, but will generally range between 15 and 60 mils. FIG. 5 shows the base panel 31 together with the pocket or sleeve panel 32. The pocket panel 32 will generally be similar to base panel 31, but will be positioned over and secured to base panel 31. The panel may be secured together by any conventional (or future developed) technique, including gluing, chemical bonding, extrusion welding, heat sealing, or simply sewing the two panels together. However, not all of the pocket panel 32 will be fixed to base panel 31. The two panels will be joined in the peripheral areas 33, but not at pocket opening or mouth 34. As suggested in FIG. 5, the combined base panel 31 and pocket panel 32 will then be secured to the underside 4 of ground section 2, such that pocket 40 is positioned on the ground section.

FIG. 5 likewise suggests how in the illustrated embodiment, the pocket 40 will have a width "w" approximating the length of end segment 15. The pocket 40 seen in FIG. 5 has a length L1 into which the bracket leg segments may slide. Often this length L1 is between 20% and 75% the length of the leg segments, but could be a larger percentage. The flexible nature of berm material and the bracket assembly allows manipulation of the leg segments and pockets necessary for the leg segments to be inserted into their respective pockets 30 and 40 (if present). Although less preferred, the pockets 30 seen in FIG. 4 could alternatively be formed in the manner shown in FIG. 5. Moreover, although it is preferred the pockets be on the outside surface of the berm, there could be specialized embodiments where the pockets were positioned on the inside surface of the berm. FIG. 2 illustrates the spacing distance "d" between hinge assemblies 10 along the sidewalls of containment berm 1. In many embodiments, the distance d will be between about 12" and about 48", with more preferred embodiments having a distance d between about 24" and about 36". Nevertheless, there could be embodiments having a spacing distance d outside of these ranges.

There could be many possible variations and modifications of the embodiments described above. For example, although the figures illustrate the end segment 15 forming the end of the pair of first leg segments 12, the cross-piece formed by end segment 15 could be positioned closer along the leg segments to joinder section 25 (as opposed to at the very end of leg segments 12). In another example, the second leg segments 17 could form an angle of greater than 90° with the plane which contains the pair of first leg segments. FIG. 3B shows the angle $\beta$ between the second leg segments 17 and the plane which contains the pair of first leg segments (the angle $\beta$ is formed in the plane containing the pair of second leg segments). In many embodiments, this angle $\beta$, when the bracket assembly is in the relaxed state, will be somewhat greater than 90°, e.g., any angle between 95° and 135°. The angle $\beta$ could be employed in conjunction with the angle $\alpha$, or could be employed in place of the angle $\alpha$ (i.e., the angle $\beta$ would be used alone in the bracket assembly).

The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

The invention claimed is:

1. A containment berm comprising:
 (a) a flexible, substantially impermeable polymer material forming a ground section with a plurality of sidewalls extending upward from the ground section;
 (b) a plurality of bracket assemblies positioned on an external surface of the containment berm, wherein each of the bracket assemblies is formed from a continuously fabricated length of wire and includes:
  (i) a pair of first leg segments having first and second ends, the pair of first leg segments being joined by an end segment at their second ends and being configured to allow the first ends to move toward one another upon compression of the first leg segments toward one another;
  (ii) a pair of second leg segments having first and second ends;
  (iii) the pair of first leg segments and the pair of second leg segments being joined at their first ends in a substantially perpendicular configuration; and
 (c) wherein one of either the pair of the first or second leg segments engages a pocket on one of the plurality of sidewalls.

2. The containment berm of claim 1, wherein the other pair of the first or second leg segments is positioned against the ground section of the berm without engaging a pocket.

3. The containment berm of claim 1, wherein the other pair of the first or second leg segments engage a pocket on the ground section of the berm.

4. The containment berm of claim 1, wherein (i) the end segment joining the pair of first leg segments is between 1" and 5" in length, and (ii) the first pair and second pair of leg segments are each between 4" and 24" in length.

5. The containment berm of claim 1, wherein the continuously fabricated length of wire is steel and has a diameter between 3 mm and 12 mm.

6. The containment berm of claim 1, wherein the second ends of the second leg segments comprise tips that are bent toward one another.

7. The containment berm of claim 1, wherein the second ends of the second leg segments comprise tips that are bent outward in an opposing direction in a plane containing the pair of second leg segments.

8. The containment berm of claim 1, wherein the containment berm has a length of between 3' and 200', a width between 3' and 100', and a wall height between 4" and 3'.

9. The containment berm of claim 1, wherein an angle α is formed between the first leg segments and the end segment, wherein α is between 95° and about 135°.

10. The containment berm of claim 9, wherein an angle β is formed between a plane containing the first leg segments and the second leg segments, wherein β is between 90° and about 135°.

11. The containment berm of claim 10, wherein the pockets have a length between about 35% and about 75% of the length of the leg segments.

12. A containment berm comprising:
 (a) a flexible, substantially impermeable polymer material forming a ground section with a plurality of sidewalls extending upward from the ground section;
 (b) a plurality of bracket assemblies positioned on a surface of the containment berm, wherein each of the bracket assemblies is formed from a continuously fabricated length of wire and includes:
  (i) a pair of first leg segments having first and second ends, the pair of first leg segments being joined by an end segment at their second ends;
  (ii) a pair of second leg segments having first and second ends;
  (iii) the pair of first leg segments and the pair of second leg segments being joined at their first ends in a substantially perpendicular configuration; and
 (c) wherein one of either the pair of first or second leg segments engages a pocket on at least one of the plurality of sidewalls.

13. The containment berm of claim 12, wherein (i) the end segment joining the pair of first leg segments is between 1" and 5" in length, and (ii) the first pair and second pair of leg segments are each between 4" and 24" in length.

14. The containment berm of claim 12, wherein the continuously fabricated length of wire is steel and has a diameter between 3 mm and 12 mm.

15. The containment berm of claim 12, wherein an angle α is formed between the first leg segments and the end segment, wherein a is between 91° and about 135°.

16. The containment berm of claim 12, wherein the pockets have a length between about 35% and about 75% of the length of the leg segments.

17. A containment berm comprising:
 (a) a flexible, substantially impermeable polymer material forming a ground section with a plurality of sidewalls extending upward from the ground section;
 (b) a plurality of bracket assemblies positioned on an external surface of the containment berm, wherein each of the bracket assemblies is formed by a continuous section of wire and includes:
  (i) a pair of first leg segments having first and second ends, the pair of first leg segments being joined at their second end by an end segment between 1" and 5" in length ends and not being joined at their first ends in order to allow relative movement between their first ends;
  (ii) a pair of second leg segments having first and second ends;
  (iii) the pair of first leg segments and the pair of second leg segments being joined at their first ends in a substantially perpendicular configuration;
  (iv) the first pair and pair of second leg segments each being between 4" and 24" in length;
  (v) the leg segments being formed from a continuous length of steel wire with a diameter between 3 mm and 12 mm; and
 (c) wherein one of either the pair of first or second of leg segments engages a pocket on at least one of the plurality of sidewalls.

18. The containment berm of claim 17, wherein the second ends of the pair of second leg segments have leg tips bent away from one another.

19. The containment berm of claim 17, wherein the second ends of the pair of second leg segments have leg tips bent toward one another.

20. The containment berm of claim 17, wherein the containment berm has a length of between 3' and 200', a width between 3' and 100', and a wall height between 4" and 3'.

\* \* \* \* \*